J. BACON.
AUXILIARY AIR INTAKE FOR INTERNAL COMBUSTION ENGINES.
APPLICATION FILED AUG. 30, 1920.
1,397,349.
Patented Nov. 15, 1921.
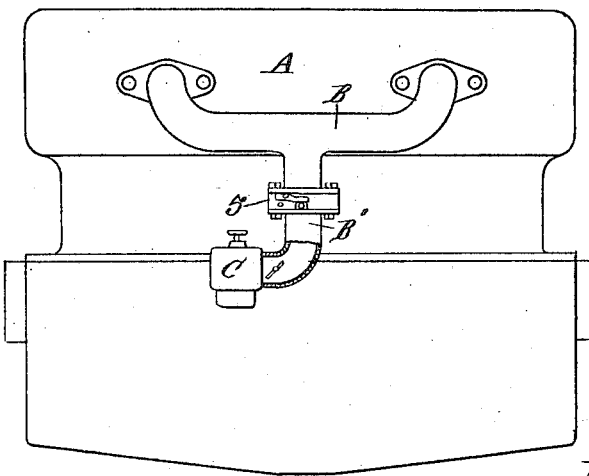
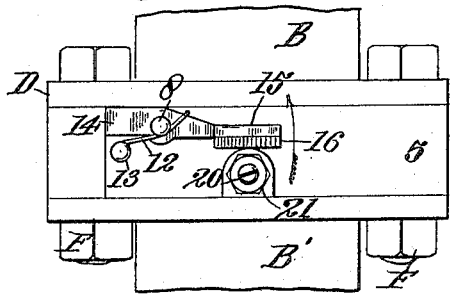
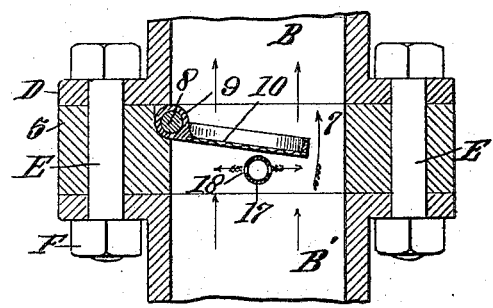
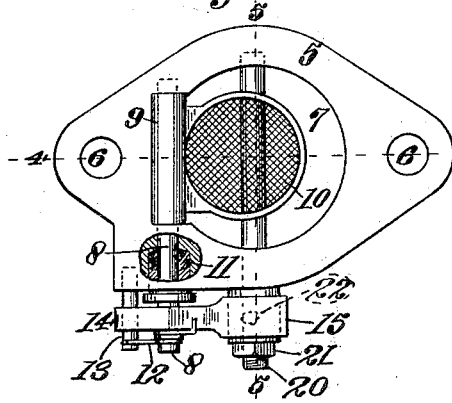
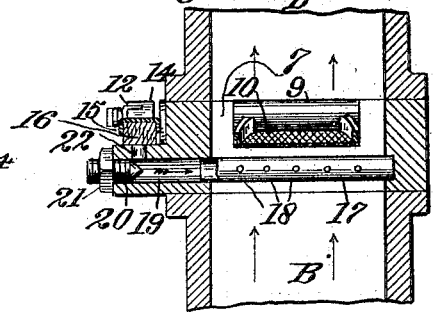
Witness.
William H. Knight
Inventor.
James Bacon.
By Munn & Co.
Attorneys.

UNITED STATES PATENT OFFICE.

JAMES BACON, OF LOS ANGELES, CALIFORNIA.

AUXILIARY AIR-INTAKE FOR INTERNAL-COMBUSTION ENGINES.

1,397,349.      Specification of Letters Patent.      Patented Nov. 15, 1921.

Application filed August 30, 1920. Serial No. 406,767.

*To all whom it may concern:*

Be it known that I, JAMES BACON, a citizen of the United States, and resident of Los Angeles, county of Los Angeles, State of California, have invented a new and useful Auxiliary Air-Intake for Internal-Combustion Engines, of which the following is a specification.

The present invention, while relating in general to charge forming devices for internal combustion engines, has reference more particularly to an improved automatically operated auxiliary air intake which is applicable to the intake manifold of engines between the charge forming device and the engine *per se*.

As a practical solution of the problems involved in devices of this character, it is proposed by this invention to so construct the device that it will operate automatically to admit a secondary supply of air directly to the intake manifold when the R. P. M. of the engine exceeds a predetermined fixed speed and thus modify the primary fuel constituent of the charge so that the engine may be operated with an economical saving of fuel.

The theory advanced may be briefly stated as based on the acknowledged fact that it does not require the same proportions of gasolene and air to develop an efficient power medium for the engine when operating at a relatively high speed as it does when the engine is throttled.

In the accompanying drawing a practical arrangement of the salient features of the invention is illustrated. In said drawing Figure 1 is a view in elevation of a conventional type of internal combustion engine from the intake manifold side and shows the application of the device. Fig. 2 is an enlarged detail side view of the device showing its fixed position in the manifold. Fig. 3 is a plan view of the device removed from the manifold. Fig. 4 is a section on the line 4—4 Fig. 3 and Fig. 5 is a section on the line 5—5 Fig. 3.

Referring now to the drawing in detail, A represents a conventional type of internal combustion engine having the usual intake manifold B, intake pipe B' and charge forming device C. As is customary, the intake pipe B' includes two or more sections joined together by flanges D through which the bolts E are passed with the nuts F engaging their threaded ends.

Taking into consideration both cost of production and installation, it is preferred to so construct the auxiliary air intake that it may be attached between the flanges D and tightly clamped therebetween by the bolts E with gaskets (not shown) making a tight joint.

The attachment represents a metal or the like block (5) of substantially the same shape and dimensions as that of the flanges D with which it is to be associated and including bolt openings (6) and a central opening (7) of the same diameter as that of the manifold. Fixed upon the pintle (8) by the sleeve (9) and presented diametrically across the opening (7) is a disk screen (10) which is capable of a slight movement axially of the direction of the carbureted charge as it passes through the manifold pipe. The pintle (8) extends exteriorly of the block through a small stuffing box (11) and terminates in a connection for the spring wire (12) which is anchored thereto with its opposite end fixed to a post (13) projecting from the side of the block parallel with the projecting end of the spindle. Pivoted intermediate its ends upon the end of the spindle is an arm or link (14) one end of which comprising a flattened finger (15) having on its under side a leather or the like piece (16); the opposite end of the arm having a bearing upon the post (13) which limits the downward movement of that end of the arm but permits the normal influence of the spring (12) to pull the flattened finger downward, the purpose of which will presently appear.

Arranged parallel of the spindle (8) and post (13) is a hollow tube (17) which extends across the openings (7) and having perforations (18) in its sides. One end of this tube is closed by its bearing in the side of the block while its opposite end is received by a bore (19) provided in the block co-axially of the tube. This bore (19) terminates on the outside of the block in its casting with an open end, interiorly threaded, and made to receive a set screw (20) having a lock nut (21). (22) represents a radial opening communicating with the bore (19) and with the atmosphere, and normally closed by the flattened finger (15) beneath which it is positioned.

As an explanation of the operation and advantages of the attachment it should be first be noted that the influence of the spring

(12) will maintain the flattened finger normally to the limit of its downward movement, thus closing the radial opening (22) and through it the bore (19) and tube (17). The screen at this time or rather the normal position of the same will be also at its limit of downward movement; its weight also acting to hold down the flattened finger upon and closing the opening (22). The weight of the screen and influence of the spring (12) are such as not to be affected by the charge as it passes through the manifold so long as the engine is throttled to a relatively low speed, as under this condition it is desired that no additional air be introduced into the manifold, but just as soon as the speed of the engine increases over and above a fixed R. P. M. the volume and velocity of the charge in passing through the screen will be sufficient by reason of frictional contact with the screen to overcome its normal position and raise the same, whereupon it will rock the arm (14) against the tension of the spring (12) and raise the flattened finger (15) thus establishing a communication to the tube (17) with the air thus admitted through the perforations (18) introduced as an auxiliary supply to the carbureted charge and in this manner increasing its air constituent without requiring an added amount of liquid fuel constituent.

The set screw (20) may be relied upon as a needle valve to regulate the effective port area of opening (22) so that the air admitted therethrough may be varied as conditions demand.

Aside from the above mentioned use of the screen it is to be noted that the same will also act to thoroughly mix or diffuse the charge before it reaches the working cylinders.

The block (5) and its integral parts may be cast or otherwise formed.

In conclusion attention is again called to the fact that it is not the suction created by the working cylinders that affects the screen to an extent that it will be moved to admit the auxiliary air, but on the contrary it is the volume of the charge and the frictional contact of the same on the screen which moves it to active position.

I claim

1. An air inlet device, adapted for use in the fuel intake of an internal combustion engine, comprising a perforated tube extending transversely across the diameter of the intake and having an outside air inlet, a pintle extending through said intake parallel with said tube having a screen thereon adapted to be actuated by the velocity of the charge passing through said intake, and a lever valve secured to said pintle outside of the intake adapted to control said air inlet.

2. An air inlet device, adapted for use in the fuel intake of an internal combustion engine, comprising a perforated tube extending transversely across the diameter of the intake and having an outside air inlet, a pintle extending through said intake parallel with said tube having a screen thereon adapted to be actuated by the velocity of the charge passing through said intake, a lever valve secured to said pintle outside of the intake adapted to control said air inlet, and means for adjusting the cross-sectional dimensions of said air inlet.

3. An air inlet device, adapted for use in the fuel intake of an internal combustion engine, comprising a perforated tube extending transversely across the diameter of the intake and having an outside air inlet, a pintle extending through said intake parallel with said tube having a screen thereon adapted to be actuated by the velocity of the charge passing through said intake, a lever valve secured to said pintle outside of the intake adapted to control said air inlet, and a set screw provided in the outer end of said tube in operative proximity to said intake adapted to limit the cross-sectional dimensions of said intake.

4. An air inlet device, adapted for use in the fuel intake of an internal combustion engine, comprising a perforated tube extending transversely across the diameter of the intake and having an outside air inlet, a pintle extending through said intake parallel with said tube having a screen thereon adapted to be actuated by the velocity of the charge passing through said intake, a lever valve secured to said pintle outside of the intake adapted to control said air inlet, a post secured to the outside of the intake adapted to limit the range of the lever valve and a spring secured to said post tending to force said lever valve on said air inlet.

JAMES BACON.